(12) United States Patent
Waldron et al.

(10) Patent No.: US 10,788,042 B2
(45) Date of Patent: Sep. 29, 2020

(54) TRACTION DRIVE FUEL CELL PUMP

(71) Applicant: SUPERTURBO TECHNOLOGIES, INC., Loveland, CO (US)

(72) Inventors: Tom Waldron, Loveland, CO (US); Jared William Brown, Loveland, CO (US)

(*) Notice: Subject to any disclaimer, the term of this patent is extended or adjusted under 35 U.S.C. 154(b) by 337 days.

(21) Appl. No.: 15/617,178

(22) Filed: Jun. 8, 2017

(65) Prior Publication Data
US 2017/0365866 A1    Dec. 21, 2017

Related U.S. Application Data

(60) Provisional application No. 62/352,507, filed on Jun. 20, 2016.

(51) Int. Cl.
| | |
|---|---|
| F04D 29/053 | (2006.01) |
| F04D 25/06 | (2006.01) |
| F04D 25/04 | (2006.01) |
| F04D 25/02 | (2006.01) |
| F04D 19/00 | (2006.01) |
| F16H 13/10 | (2006.01) |
| F04D 17/10 | (2006.01) |
| H01M 8/04111 | (2016.01) |
| H01M 8/04082 | (2016.01) |
| F16H 13/08 | (2006.01) |
| F16H 13/06 | (2006.01) |

(52) U.S. Cl.
CPC ............ *F04D 25/028* (2013.01); *F04D 17/10* (2013.01); *F04D 19/00* (2013.01); *F04D 25/024* (2013.01); *F04D 25/045* (2013.01); *F04D 25/06* (2013.01); *F04D 25/0606* (2013.01); *F04D 29/053* (2013.01); *F16H 13/08* (2013.01); *H01M 8/04111* (2013.01); *H01M 8/04201* (2013.01); *F16H 13/06* (2013.01); *H01M 2250/20* (2013.01); *Y02T 90/40* (2013.01)

(58) Field of Classification Search
CPC ........ F04D 17/10; F04D 19/00; F04D 25/024; F04D 25/028; F04D 25/045; F04D 25/0606; F04D 29/053; F16H 13/08; F16H 13/06; H01M 8/04111; H01M 8/04201; H01M 2250/20; Y02T 90/32
USPC ...................................... 417/423.1
See application file for complete search history.

(56) References Cited

U.S. PATENT DOCUMENTS

| | | | |
|---|---|---|---|
| 8,668,614 B2* | 3/2014 | Sherrill | F16H 13/10 475/183 |
| 2013/0260936 A1* | 10/2013 | Takei | B60K 6/365 475/5 |
| 2014/0370412 A1* | 12/2014 | Sumser | F01D 3/00 429/446 |
| 2015/0037147 A1* | 2/2015 | Okada | F04D 29/624 415/220 |

(Continued)

*Primary Examiner* — Connor J Tremarche
(74) *Attorney, Agent, or Firm* — Cochran Freund & Young LLC; William W. Cochran (57) ABSTRACT

Disclosed is an air pump for a fuel cell that utilizes a speed-reduction traction drive so that a low speed electric motor can be used to drive a high-speed rotodynamic compressor. The rotodynamic compressor is an efficient air pump, but operates at high speeds that would require a specialized high-speed electric motor. The speed-reduction traction drive couples to the compressor and provides a low-speed output that is connected to a lower speed electric motor.

15 Claims, 6 Drawing Sheets

(56) References Cited

U.S. PATENT DOCUMENTS

2015/0141188 A1\* 5/2015 Sherrill ................ F02B 37/105
475/32

\* cited by examiner

Fig. 1

TRACTION DRIVE FUEL CELL PUMP

BACKGROUND

Fuel cells are an alternative source of energy to energy provided by batteries for powering electric vehicles. The fuel cell operates by controlling the combination of a fuel, commonly hydrogen, and oxygen in air to produce electricity that is then used to power electric motors that drive the vehicle. Fuel cell pumps can be used to pressurize the air entering the fuel cell to increase the power density and efficiency of the fuel cell. Higher power density allows a reduction in size and cost of the fuel cell.

SUMMARY

An embodiment of the present invention may therefore comprise an air pump for a fuel cell comprising: a rotodynamic compressor that pressurizes intake air for the fuel cell; a high-speed shaft attached to the rotodynamic compressor; a speed-reduction traction drive that interfaces with the high-speed shaft; an electric motor that is attached to a low-speed output of the speed-reduction traction drive that drives the rotodynamic compressor through the speed-reduction traction drive.

An embodiment of the present invention may therefore further comprise a method of pumping air to create a source of pressurized air for a fuel cell, comprising: rotating a low speed shaft with an electric motor, the low speed shaft connected to a roller; rotating a high speed shaft with the roller using a traction drive that is formed from an interface between a surface of the roller and a surface of the high speed shaft; driving a rotodynamic compressor with the high speed shaft to create the source of pressurized air; applying the source of pressurized air to the fuel cell.

An embodiment of the present invention may therefore further comprise a method of pumping air to create a source of pressurized air for a fuel cell comprising: rotating a low speed shaft with an electric motor; driving a traction drive with the low speed shaft; driving a high speed shaft with the traction drive; driving a rotodynamic compressor with the high speed shaft to create the source of pressurized air to the fuel cell.

DETAILED DESCRIPTION OF THE EMBODIMENTS

Figure 1:
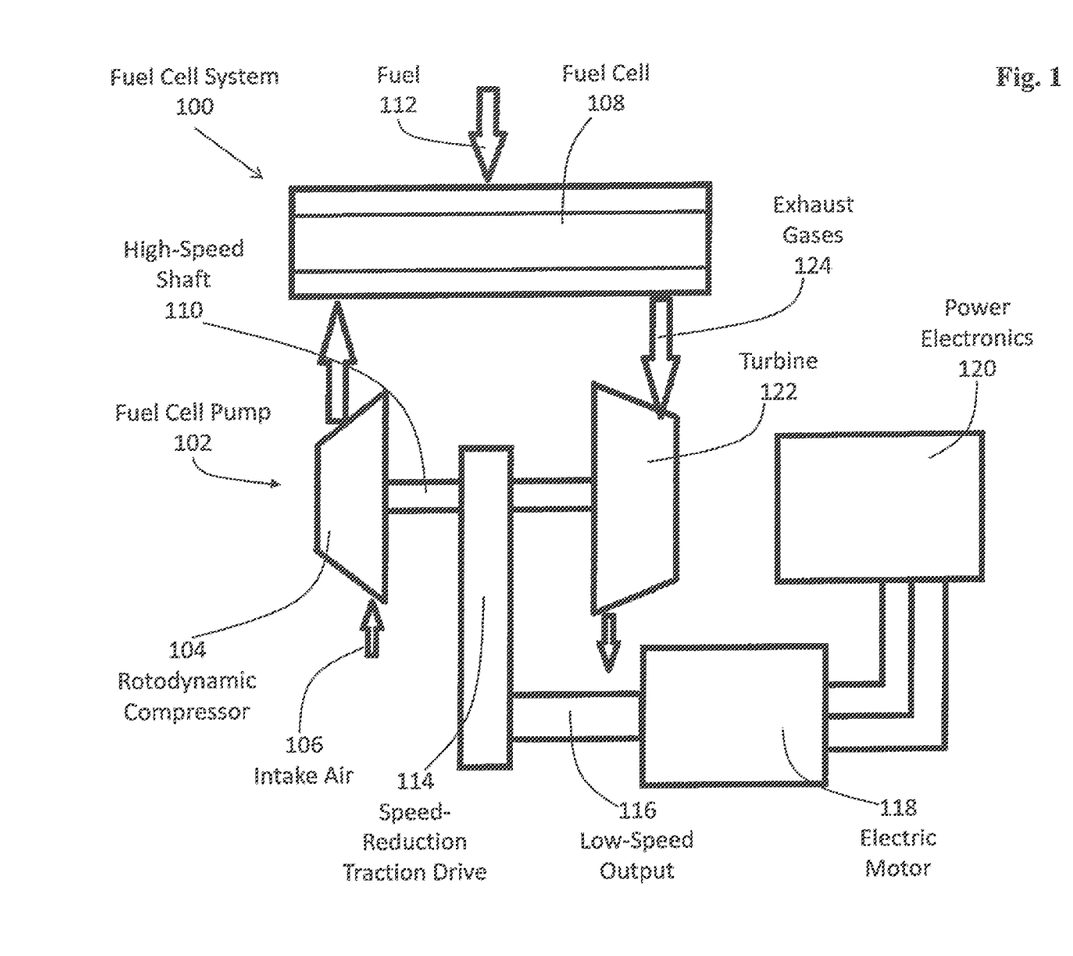
FIG. 1 is a schematic diagram of a fuel cell system with a fuel cell pump.

FIG. 1 is a schematic diagram of a fuel cell system 100 with a fuel cell pump 102. Fuel cell pumps can be used to pressurize the air entering the fuel cell to increase the power density and efficiency of the fuel cell. Higher power density allows a reduction in size and cost of the fuel cell. Rotodynamic compressor 104 compresses intake air 106 for fuel cell 108 and is driven by high-speed shaft 110. The forced charging of intake air 106 allows fuel cell 108 to have a greater power density and efficiency than if ambient air is used for intake air 106. Fuel cell 108 combines fuel 112 (such as hydrogen) with intake air 106 in a controlled manner to produce electricity, which can be used to power an electric vehicle. Normally, hydrogen is used for fuel 112, but other types of fuel can be used as well. Rotodynamic compressor 104 can be of a radial or axial design. The use of a rotodynamic compressor 104 enables high efficiency charging of intake air 106 with a small device, but at the cost that rotodynamic compressor 104 must operate at a high rotational speed, commonly in the range of 100,000 to 200,000 RPM. As most devices have difficulty operating at these high rotational speeds, a speed-reduction traction drive 114 is used. Speed-reduction traction drive 114 interfaces with high speed shaft 110, and provides a fixed ratio speed step-down to a low-speed output 116 of speed-reduction traction drive 114. This fixed ratio can be in the range of 10:1 to 20:1, reducing the rotational speeds of 100,000 to 200,000 RPM of rotodynamic compressor to speeds in the range of 5,000-20,000 RPM at a low-speed output 116 of speed-reduction traction drive 114. Electric motor 118 is connected to low-speed output 116 of speed-reduction traction drive 114, and provides power to fuel cell pump 102 which drives rotodynamic compressor 104 through speed-reduction traction drive 114. In this way, speed-reduction traction drive 114 allows a more conventional, lower speed electric motor 118 to drive rotodynamic compressor 104 at the high rotational speeds required by rotodynamic compressor 104 to pressurize intake air 106 for fuel cell 108. Electric motor 118 is controlled and powered by power electronics 120 of fuel cell system 100.

Additionally shown in FIG. 1 is an optional turbine 122 that is attached to high-speed shaft 110. Turbine 122 can be utilized to help drive rotodynamic compressor 104, so that the power requirement from electric motor 118 and speed-reduction traction drive 114 can be reduced. Turbine 122 can also be of a radial or axial design, and extracts power from exhaust gases 124 of fuel cell 108 that are produced after fuel 112 and intake air 106 are combined in fuel cell 108. Turbine 122 could also be powered by exhaust gasses of an internal combustion engine, if fuel cell 108 is used in a hybrid application.

Figure 2:
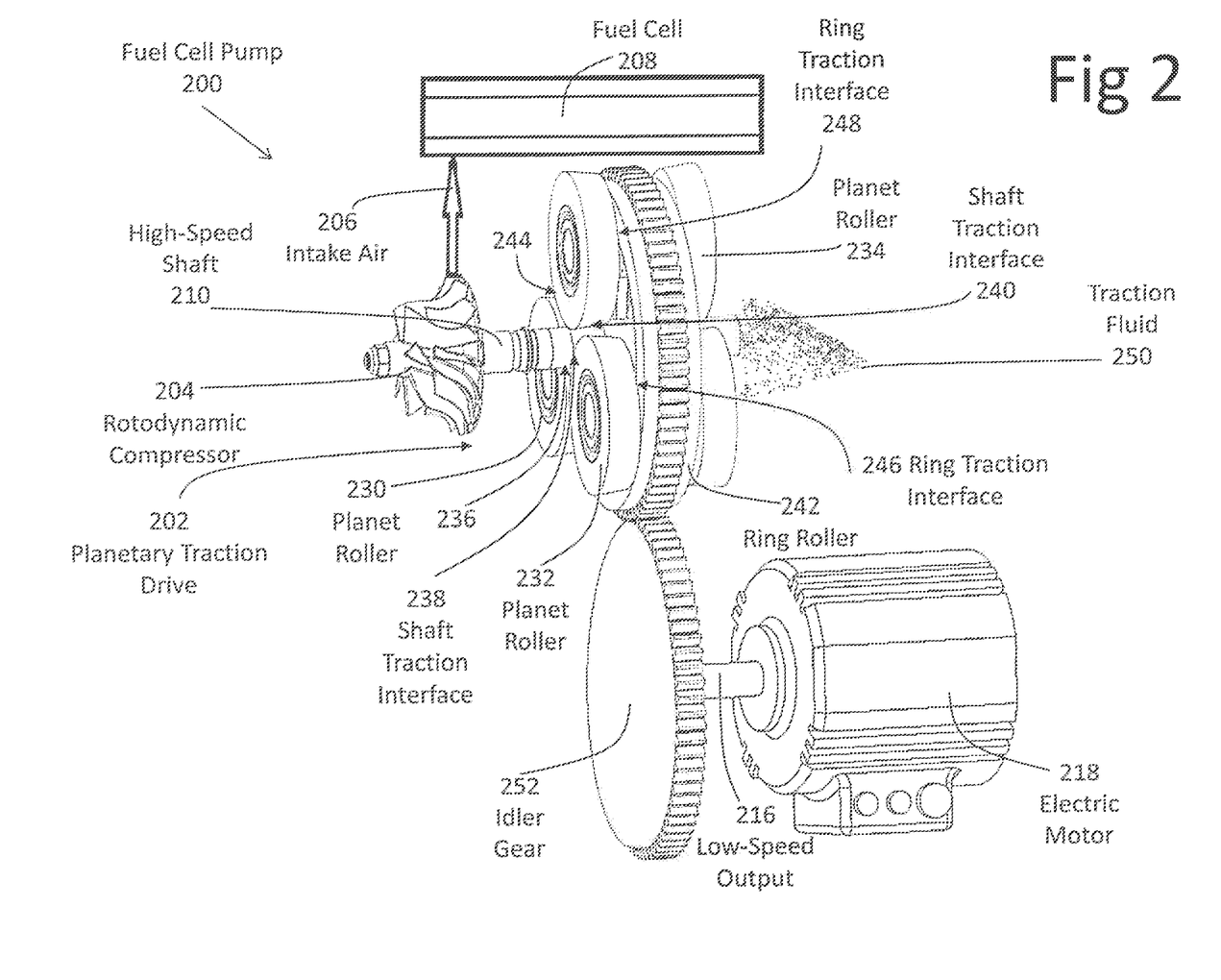
FIG. 2 is an isometric view of a fuel cell pump with a planetary traction drive.

FIG. 2 is an isometric view of a fuel cell pump 200 with a planetary traction drive 202. Rotodynamic compressor 204 pressurizes intake air 206 for fuel cell 208 and is attached to high-speed shaft 210. Rotodynamic compressor 204 is shown as a radial compressor, but can also be of an axial design. High-speed shaft 210 functions as the sun of the planetary traction drive 202. Planet rollers 230, 232, 234 transmit torque to high-speed shaft 210 via shaft traction interfaces 236, 238, 240. As shown, shaft traction interfaces 236, 238, 240 can be shaped, as taught in U.S. Pat. No. 9,670,832, issued Jun. 6, 2017, entitled "Thrust Absorbing Planetary Traction Drive Superturbo" which is specifically incorporated herein by reference for all that it discloses and teaches, to locate high-speed shaft 210 axially and absorb thrust forces from rotodynamic compressor 204. In this case, planetary traction drive 202 is a thrust-absorbing traction drive. Planet rollers 230, 232, 234 can also be double roller planets as shown, such that each planet 230, 232, 234 is composed of two rollers that interface with high-speed shaft 210 as taught in U.S. Pat. No. 8,668,614, issued Mar. 11, 2014, entitled "High Torque Traction Drive," which is specifically incorporated herein by reference for all that it discloses and teaches. In this case, planetary traction drive 202 is a double roller planetary traction drive. Ring roller 242 transmits torque to planets 230, 232, 234 through ring traction interfaces 244, 246, 248. Traction fluid 250 may optionally be used to increase the torque capacity of shaft traction interfaces 236, 238, 240 and ring traction interfaces 244, 246, 248. Ring roller 242 is driven by idler gear 252, which forms the low-speed output 216 of planetary traction drive 202. Low-speed output 216 rotates at approximately 5-10% of the speed of high-speed shaft 210, depending on the design of planetary traction drive 202. Electric motor 218 is connected to low-speed output 216 of traction drive. In this way, electric motor 218 drives low-speed output 216 of planetary traction drive 202, which transmits power to high-speed shaft 210 to drive rotodynamic compressor 204. The fixed ratio speed step-down between high-speed shaft 210 and low-speed output 216 provided by planetary traction drive 202 allows electric motor 218 to rotate a much lower speed than rotodynamic compressor 204.

Figure 3:
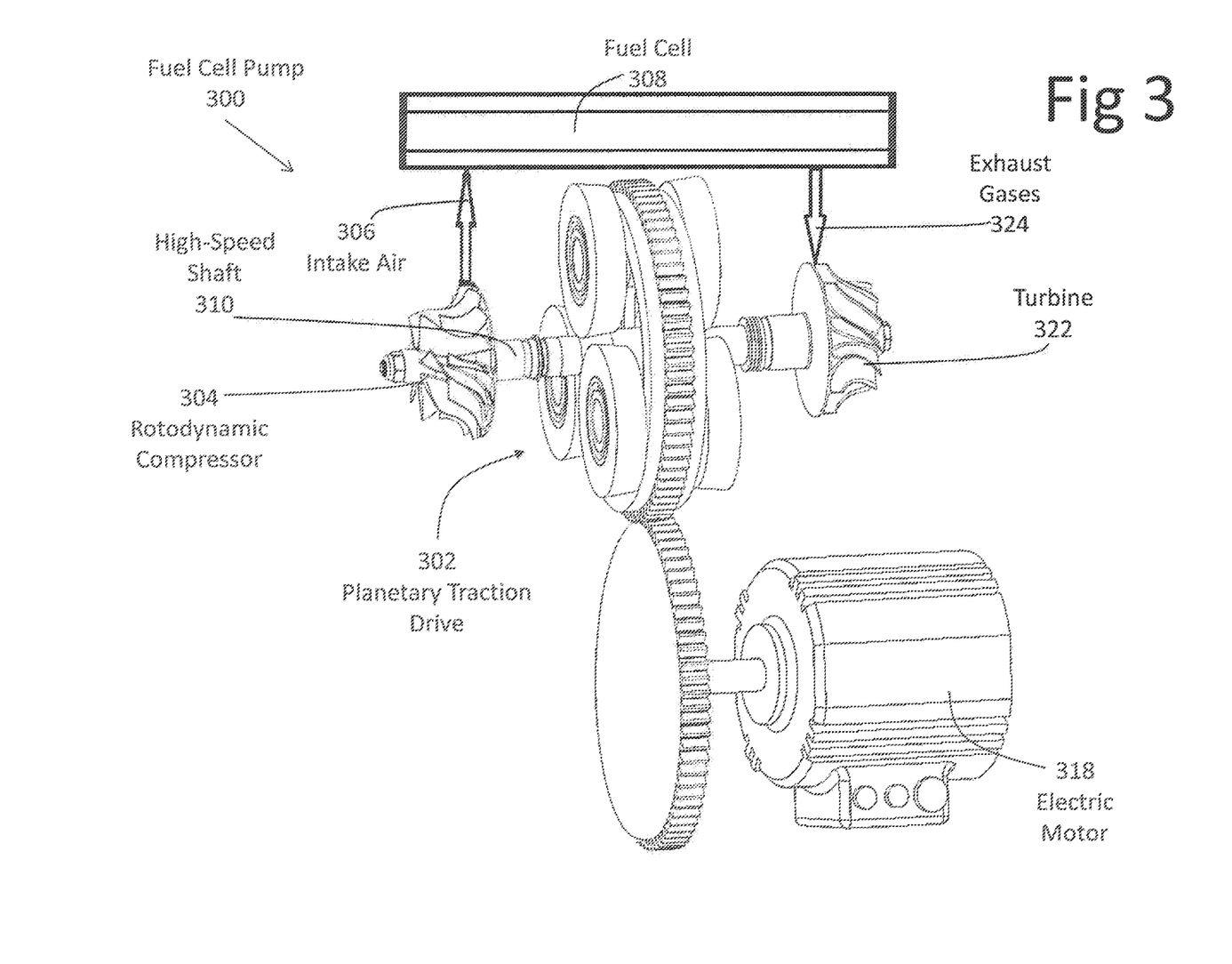
FIG. 3 is an isometric view of a fuel cell pump with a planetary traction drive and the addition of a turbine.

FIG. 3 is an isometric view of a fuel cell pump 300 with a planetary traction drive 302 and the addition of a turbine 322. As in FIG. 2, rotodynamic compressor 304 pressurizes intake air 306 for fuel cell 308. High-speed shaft 310 is coupled to planetary traction drive 302, which in turn is coupled to and driven by electric motor 318. In addition, turbine 322 is connected to high-speed shaft 310, and is driven by exhaust gases 324 from fuel cell 308. Turbine 322 provides a portion of the power necessary to drive rotodynamic compressor 304, so that the power requirement from electric motor 318 supplied through planetary traction drive 302 is decreased. Turbine 322 is shown as a radial turbine, but can also be of an axial design. Turbine 322 can also be coupled to the exhaust gasses 328 of a gasoline, diesel, natural gas, or hydrogen internal combustion 326 engine used in a hybrid system 330.

Figure 4:
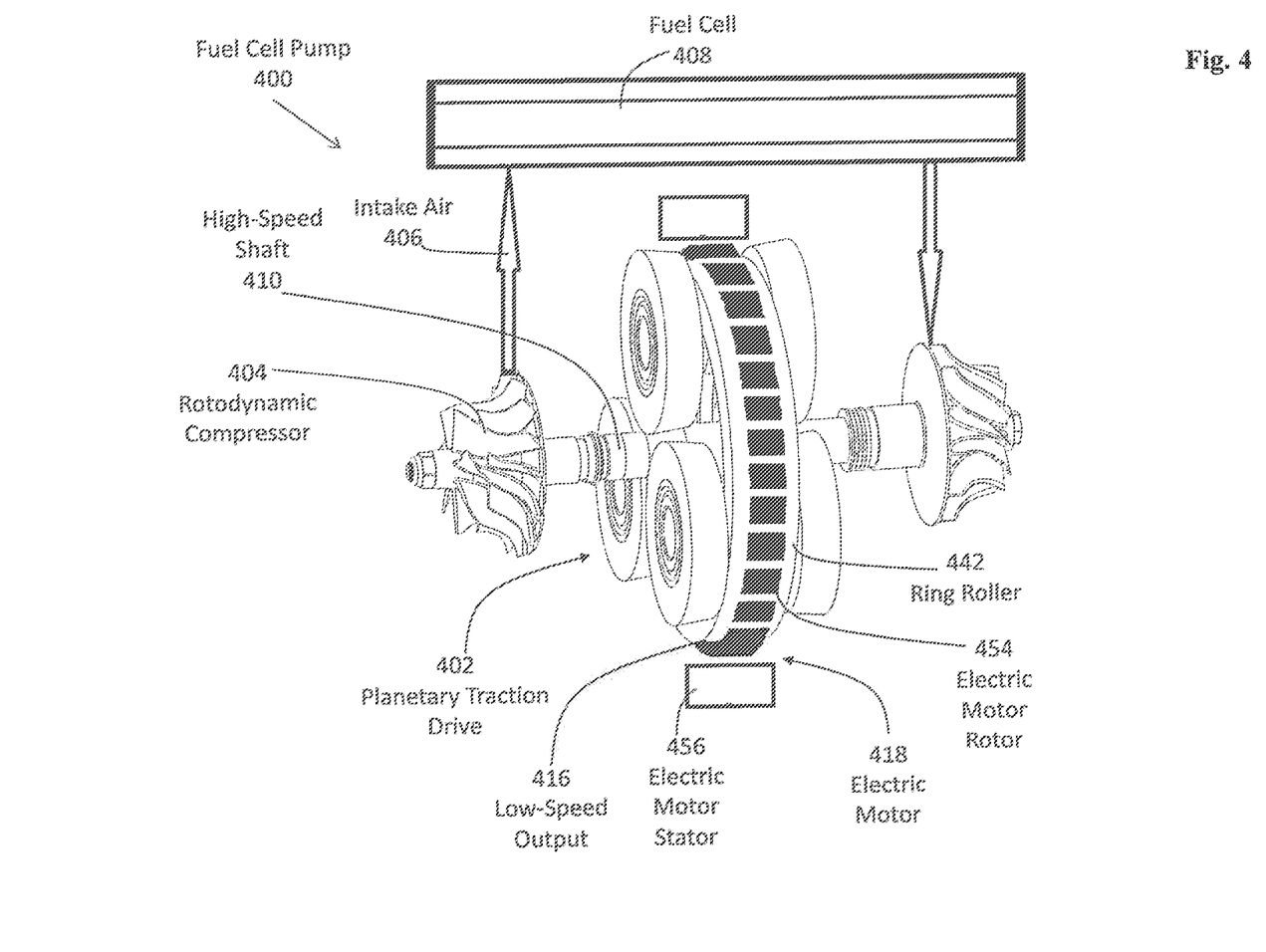
FIG. 4 is an isometric view of a fuel cell pump with a planetary traction drive, where the electric motor is integrated into a ring roller of the planetary traction drive.

FIG. 4 is an isometric view of a fuel cell pump 400 with a planetary traction drive 402, where electric motor 418 is integrated into ring roller 442 of planetary traction drive 402. The function of planetary traction drive 402 to drive high-speed shaft 410 and rotodynamic compressor 404 is the same as shown in FIG. 3, but the low-speed output 416 of planetary traction drive 402 is reconfigured to be integrated into ring roller 442. Electric motor rotor 454 is combined with ring roller 442, and together form low-speed output 416 of planetary traction drive 402, so no additional parts or gearing is necessary. Electric motor stator 456 is arranged around electric motor rotor 454 and electrically drives electric motor rotor 454. If planetary traction drive 402 is designed to run dry, without use of traction fluid, then the lack of additional gears allows for the entire fuel cell pump 400 to operate without lubrication fluid. The ability to operate fuel cell pump 400 without any circulating fluids simplifies the sealing of fuel cell pump 400 to keep any fluids from entering intake air 406 and contaminating fuel cell 408.

Figure 5:
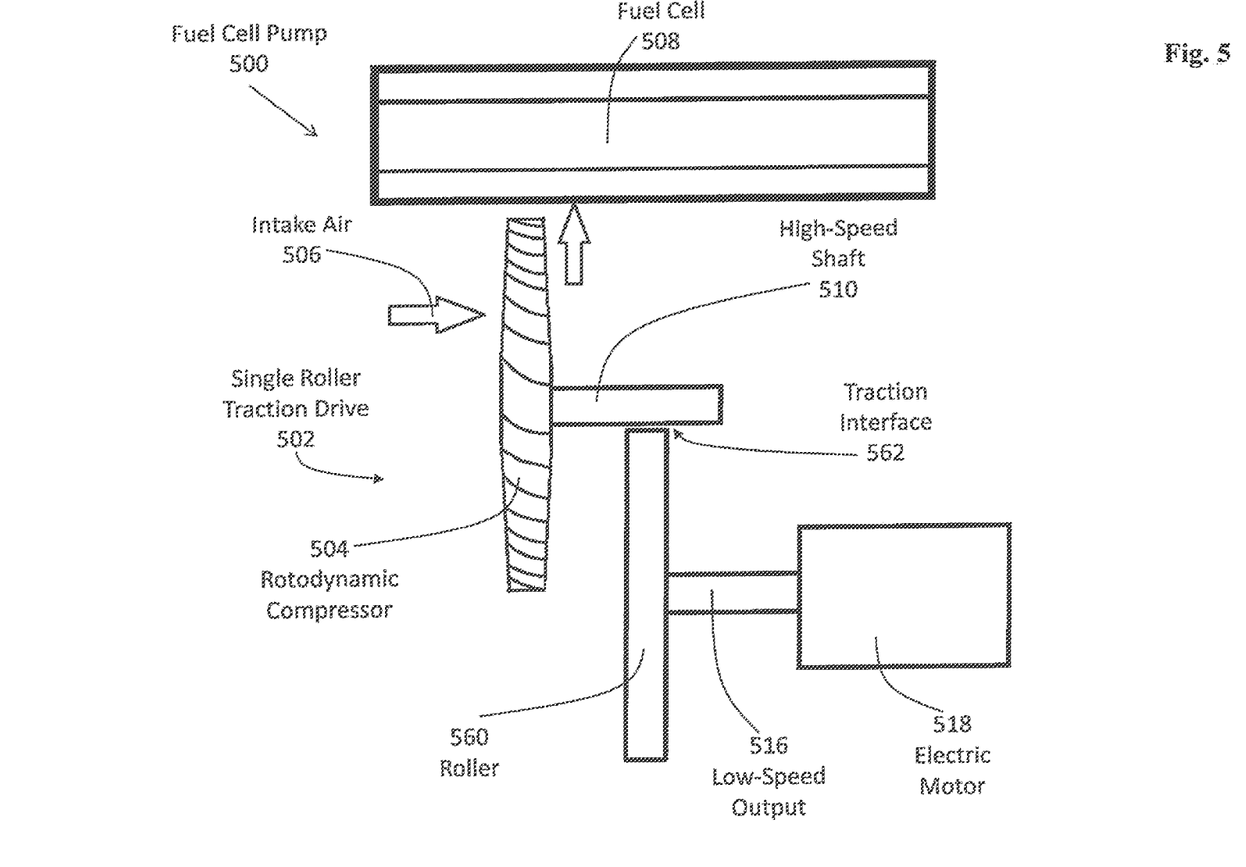
FIG. 5 is a schematic diagram of a fuel cell pump with a single roller traction drive.

FIG. 5 is a schematic diagram of a fuel cell pump 500 with a single roller traction drive 502. Rotodynamic compressor 504 pressurizes intake air 506 for fuel cell 508, and is attached to high-speed shaft 510. Rotodynamic compressor 504 is shown as an axial compressor, but can also be of a radial design. Roller 560 transmits torque to high-speed shaft 510 through traction interface 562, which forms single roller traction drive 502. Single roller traction drive 502 can be of a variety of designs, as taught in U.S. patent application Ser. No. 14/885,781, filed Oct. 16, 2015, entitled "Speed Reduced Driven Turbocharger" which is specifically incorporated herein by reference for all that it discloses and teaches. Roller 560 is of a larger diameter than high-speed shaft 510, so that it spins at a lower speed than high-speed shaft 510. As an example, a roller 560 of diameter of 10 cm could interface with a high-speed shaft 510 of a diameter of 1 cm to form a 10:1 reduction ratio. Low-speed output 516 of single roller traction drive 502 is attached to roller 560. Electric motor 518 is attached to low-speed output 516 of single roller traction drive 502, and provides power at a lower rotational speed to single roller traction drive 502 that drives high-speed shaft 510 and rotodynamic compressor 504 at a high rotational speed.

Figure 6:
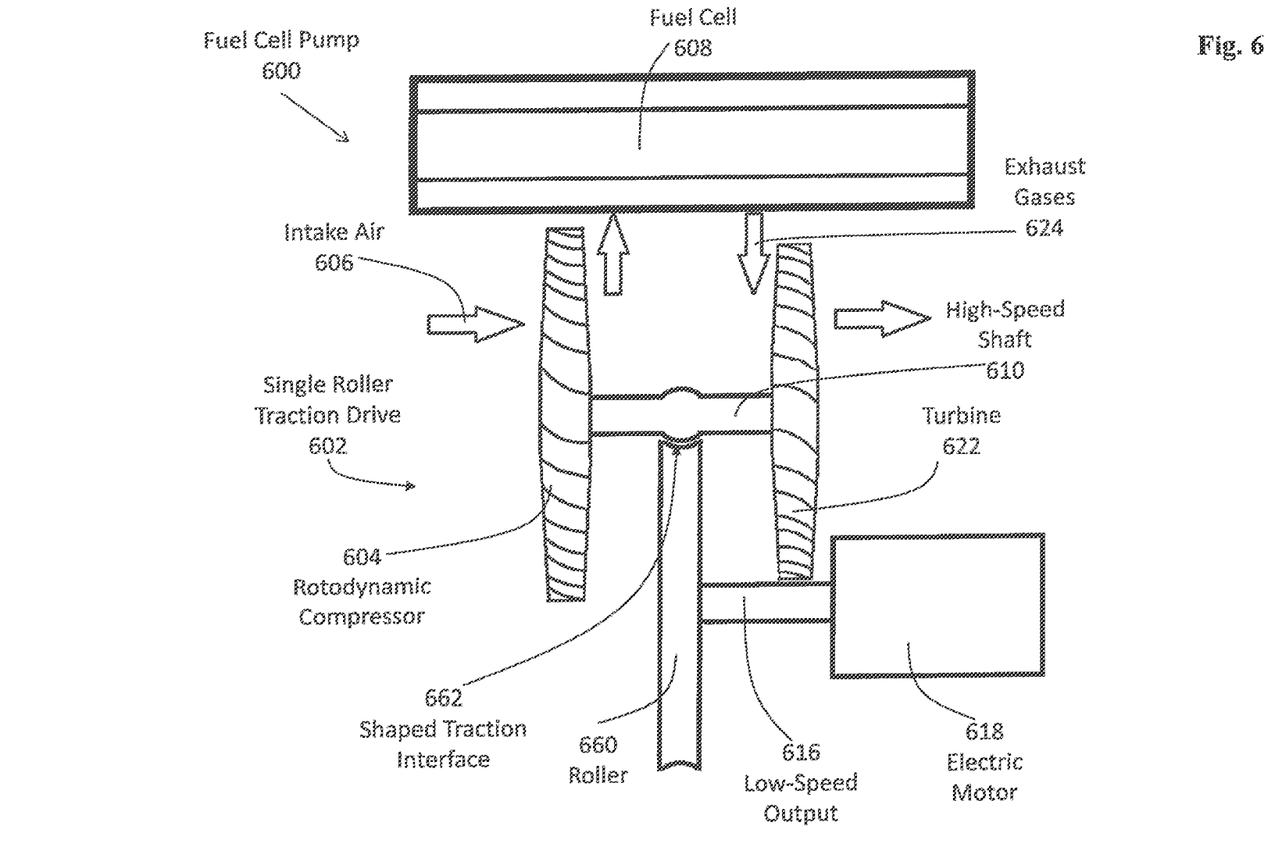
FIG. 6 is a schematic diagram of a fuel cell pump with a single roller traction drive and the addition of a turbine.

FIG. 6 is a schematic diagram of a fuel cell pump 600 with a single roller traction drive 602 and the addition of a turbine 622. As in FIG. 5, rotodynamic compressor 604 pressurizes intake air 606 for fuel cell 608 and is connected to high-speed shaft 610. Turbine 622 is also connected to high-speed shaft 610, and extracts power from exhaust gases 624 of fuel cell 608 to help power rotodynamic compressor 604. Turbine 622 is shown as an axial design, but can also be of a radial design. High-speed shaft 610 is also driven by roller 660 through shaped traction interface 662. Shaped traction interface 662 locates high-speed shaft 610 axially and absorbs thrust forces from rotodynamic compressor 604 and turbine 622. Roller 660 is connected to low-speed output 616 of single roller traction drive 602, which is driven by electric motor 618. Together, turbine 622 and electric motor 618 power rotodynamic compressor 604 to provide additional air flow to fuel cell 608. The use of single roller traction drive 602 allows electric motor 618 to rotate at a lower speed than high-speed shaft 610 and rotodynamic compressor 604.

Hence, higher power density can be achieved by providing a source of compressed air to fuel cells. A rotodynamic compressor can be driven by an electric motor and, optionally, a turbine. This increases efficiency of the overall system. Because rotodynamic compressors, including radial and axial compressors, operate at very high rotational speeds, a way to drive the rotodynamic compressors is required. Since traction drives are capable of operating at high rotational speeds, rotodynamic compressors can be driven by traction drives that provide a low speed shaft that can be driven by an electric motor, or a motor from a hybrid drive system. As such, rotodynamic compressors can be driven by standard electric motors and the rotational speed of the electric motor can be multiplied by a traction drive to drive the rotodynamic compressor.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An air pump for a fuel cell using a traction drive to pump air into said fuel cell comprising:
   a turbo shaft;
   a rotodynamic compressor that pressurizes intake air for said fuel cell that is connected to said turbo shaft and is driven by said turbo shaft;

a first traction surface on, or coupled to, said turbo shaft;

a roller having a second traction surface that interfaces with said first traction surface to create a traction drive interface, said roller having a diameter that is larger than a diameter of said first traction surface so that rotational speed of said roller is less than a rotational speed of said turbo shaft;

a motor shaft that is coupled to said roller that rotates at a rotational speed that is less than said turbo shaft;

a motor that is attached to said motor shaft that drives said motor shaft and said roller, said roller causing said turbo shaft to rotate at a rotational speed that is higher than said motor shaft, of at least 100,000 to 200,000 RPMs, causing said rotodynamic compressor to pump air into said fuel cell.

2. The air pump of claim 1 further comprising:

a turbine connected to said turbo shaft that extracts power from exhaust gases of said fuel cell and provides energy in rotating said turbo shaft.

3. The air pump of claim 1 where said rotodynamic compressor is a radial compressor.

4. The air pump of claim 1 where said rotodynamic compressor is an axial compressor.

5. The air pump of claim 1 where said traction drive is a planetary traction drive.

6. The air pump of claim 5 where said planetary traction drive is a double-roller planetary traction drive.

7. The air pump of claim 5 where said electric motor is integrated into a ring roller of said planetary traction drive.

8. The air pump of claim 1 where said roller is a single-roller.

9. The air pump of claim 1 where said traction drive is a thrust-absorbing traction drive.

10. The air pump of claim 1 where traction fluid is used in said traction drive to increase torque transmission in said traction drive.

11. A method of pumping air to create a source of pressurized air for a fuel cell, comprising:

rotating a first shaft with an electric motor, said first shaft coupled to a roller;

rotating a second shaft with said roller using a traction drive that is formed from an interface between a traction surface of said roller and a traction surface of said second shaft or a traction surface coupled to said second shaft;

driving a rotodynamic compressor with said second shaft at a rotational speed of at least 100,000 to 200,000 RPMs to create said source of pressurized air;

applying said source of pressurized air to said fuel cell.

12. The method of claim 11 further comprising:

driving a turbine with exhaust gases from said fuel cell;

using said turbine to assist in driving said rotodynamic compressor.

13. The method of claim 12 wherein said process of rotating said second shaft with said roller using said traction drive comprises:

rotating said second shaft with said roller using said traction drive that has a shaped traction interface that absorbs thrust forces on said second shaft.

14. The method of claim 11 wherein said traction drive comprises:

a planetary roller traction drive.

15. The method of claim 14 further comprises:

placing an electric motor rotor on a ring roller of said planetary roller traction drive;

driving said ring roller with at least one electric motor stator as a result of said electric motor stator interacting with said electric motor rotor.

\* \* \* \* \*